United States Patent [19]

Tonhäuser et al.

[11] Patent Number: 5,275,207
[45] Date of Patent: Jan. 4, 1994

[54] MULTIWAY VALVE

[75] Inventors: Wilhelm Tonhäuser, Winterbach; Günter Kellerman, Remseck; Frank Thoma, Stuttgart, all of Fed. Rep. of Germany

[73] Assignee: Mercedes-Benz AG, Fed. Rep. of Germany

[21] Appl. No.: 942,170

[22] Filed: Sep. 8, 1992

[30] Foreign Application Priority Data

Sep. 7, 1991 [DE] Fed. Rep. of Germany ....... 4129828

[51] Int. Cl.⁵ .................. F16K 11/00; F16K 11/14
[52] U.S. Cl. ......................... 137/870; 123/198 DB; 137/596.17; 137/625.27; 137/625.43; 137/625.65
[58] Field of Search ............... 123/198; 137/596.17, 137/625.27, 625.43, 625.65, 870

[56] References Cited

U.S. PATENT DOCUMENTS

| | | | |
|---|---|---|---|
| 2,867,237 | 1/1959 | Allingham | 137/625.43 X |
| 3,202,182 | 8/1965 | Haviland | 137/625.65 X |
| 3,525,364 | 8/1970 | Esche | 137/625.65 |
| 3,589,400 | 6/1971 | Bruyn | 137/625.43 |
| 3,602,246 | 8/1971 | Hettinger et al. | 137/625.27 X |
| 3,779,280 | 12/1973 | Evans et al. | |
| 4,361,121 | 11/1982 | Clemens et al. | 123/198 DB |
| 4,953,585 | 9/1990 | Rollini et al. | |
| 4,971,115 | 11/1990 | Tinholt | 137/625.27 X |
| 5,109,886 | 5/1992 | Takata et al. | 137/596.17 |
| 5,152,265 | 10/1992 | Hummel et al. | 137/625.43 X |

FOREIGN PATENT DOCUMENTS

| | | |
|---|---|---|
| 0359193 | 3/1990 | European Pat. Off. . |
| 2650701 | 5/1978 | Fed. Rep. of Germany . |
| 3700899 | 7/1980 | Fed. Rep. of Germany . |
| 3739198 | 5/1989 | Fed. Rep. of Germany . |
| 3934389 | 4/1991 | Fed. Rep. of Germany ...... 123/198 DB |
| 955910 | 1/1950 | France ........................... 137/625.27 |
| 2156489 | 10/1985 | United Kingdom . |

*Primary Examiner*—Gerald A. Michalsky
*Attorney, Agent, or Firm*—Evenson, McKeown, Edwards & Lenahan

[57] ABSTRACT

A multiway valve, in particular a 4/2-way valve, has a housing provided with an axial hole having a plurality of steps to form four seat elements located one behind the other. The housing includes two end chambers and at least two intermediate spaces between these end chambers, with one of the valve connections opening into each. A spool-type drive pin carrying at least two closing elements is located in the axial hole. The drive pin is guided so as to seal at its one end and is radially supported in the axial hole by radial protrusions at its other end. This drive pin has a longitudinal passage which is connected to the first chamber via radial holes at its one end and to the second chamber via its opening provided on the related end of the drive pin at its other end. The closing elements are partially elastically flexible and interact with the seat elements. The closing elements are configured as sleeve-shaped or annular and each has two opposed sealing surfaces which can be laid on one or other seat element of the associated seat element pair depending on the valve position.

18 Claims, 3 Drawing Sheets

1

MULTIWAY VALVE

BACKGROUND AND SUMMARY OF THE INVENTION

The invention concerns a multiway valve with two valve positions, and, in particular a 4/2-way valve whose connections are always interconnected in pairs. The present invention makes it possible to change the pairwise association of the connections by switching over from one valve position to the respective other valve position. The valve housing is provided with an axial hole which has a plurality of steps to form seat elements located in series and includes two end chambers and an intermediate space therebetween, into which one of the connections opens. A spool-type drive pin carrying at least two closing elements is located in the axial hole, the drive pin being guided so as to seal in the region of a first of the two chambers. One of the connections also opens at least into the second chamber, and the drive pin has an inner longitudinal passage which is connected by at least one radial hole to the first chamber at one end and opens at the other end into the second chamber on the associated end of the drive pin. The closing elements which interact at least partially elastically and flexibly with the seat elements each are of a sleeve-shaped or annular configuration.

Multiway valves are often constructed as straightforward spool valves. Although such spool valves are of relatively simple design, they are relatively sensitive to dirt, thereby causing the valve spool to be jammed by dirt in extreme cases. Seat-controlled valves, on the other hand, are relatively insensitive to dirt. A relatively high level of design complexity is, however, generally necessary if, in one valve position, a plurality of closing elements are simultaneously to rest on associated seat elements.

DE-OS 37 00 899 discloses a multiway valve of the initially indicated type which is of hybrid construction providing seat-controlled valve elements, on one hand, and spool valve elements, on the other hand. Although this arrangement ensures that only one closing element of a seat-controlled valve element must interact with an associated seat element in each valve position, because spool valve elements also become effective in each valve position, nevertheless the danger of jamming of the spool valve elements exists in principle in this known multiway valve.

A 5/2-way valve is already known from U.S. Pat. No. 3,779,280 in which, however, one of the connections is completely shut off in each valve position. This 5/2-way valve includes a control rod extending through the housing, and closing elements displaceably located on this control rod in the form of a plurality of discs having a diameter which is relatively large compared with the control rod. These discs interact with valve seats on the housing. The discs are located in pairs on the rod, and a spring is provided between the two discs of each disc pair. These two discs, located between two stops on the rod, are forced apart in the direction of the stops by the spring. The control rod is guided to the outside through one closing cap at each end and is supported outside the valve space.

With this known arrangement, it is impossible to exclude the possibility that the discs, which have a relatively large diameter, may tilt and tip while being displaced on the rod. The design length is also relatively large, because the rod is guided through closing caps at both ends to the outside for support. Another unfavorable feature is that only directly adjacent valve spaces or chambers can be connected to one another in this valve. Because, moreover, one of the connections is completely shut off in each valve position, this valve is unsuitable from the outset for an application such as one in which the connections always have to be interconnected in pairs and in which only the pairwise association of the connections is to be changed when switching from one valve position to the respective other valve position.

A 3/3-way valve with a control rod having a through hole is disclosed in DE-OS 26 50 701. This control rod is subjected to two control forces acting in opposite directions and carries a displaceable valve body supported by a spring on the valve housing and by a further spring on the valve rod. In this arrangement, the valve body forms a first inlet valve by way of a contracted edge of the housing and a second inlet valve by way of an edge provided on the valve rod. The valve rod, guided and supported at one end, is located between two valve spaces which can be connected together by the hole provided in the rod and, in each of which, is located a piston acting on the relevant end of the rod.

In addition to having a relatively complicated construction, this valve also has the disadvantage that it is possible, because the valve rod is only guided and supported at one end, that the valve rod may be deflected laterally at its free end due, for example, to an external shock load or the like. This can lead to impairment of the valve function particularly since the valve bodies are provided on this free and unguided end of the valve rod.

Finally, DE-PS 37 39 198 relates to a fuel injection pump for internal combustion engines. This pump has a pump inner chamber and a regulator space, separate therefrom, having a regulator which serves to adjust the respective volume of fuel injected. In this arrangement, apparatuses are provided to be capable of compensating the temperature for the measured volume of fuel.

An object of the present invention is to provide an improved multiway valve of the initially indicated type which, on one hand, is relatively insensitive to dirt and, on the other hand, has a simple and compact construction, so that a high level of functional reliability is ensured at all times.

This object has been achieved according to the present invention in that at least four seat elements located in series and at least two intermediate spaces located between the two end chambers are provided in the multiway valve, and the drive pin is radially supported in the region of its end close to the second chamber by radial protrusions provided on its outer periphery. The closing elements include two oppositely directed sealing surfaces which can be laid on one or other seat element of the associated seat element pair, depending on the valve position. A first of the closing elements directly adjoins the radial protrusions in the direction of the second chamber.

The present invention not only combines the advantages of spool valves with those of seat valves, but also achieves the result that, in addition to insensitivity to dirt, optimum functional reliability is provided. Surprisingly, the multiway valve can also still be constructed in an extremely simple and compact manner and can be manufactured without difficulty. Because support and guidance of one end of the drive pin within the axial hole of the valve housing takes place via the radial protrusions, this end of the drive pin with the end passage opening can be located within the axial hole, and in particular within the second chamber, so that it is also possible to produce a connection between both end chambers without difficulty, by way of the longitudinal passage provided in the drive pin, with optimum support and guidance of the drive pin at both ends.

The longitudinal passage opening into the second chamber at one end of the drive pin can be manufactured without difficulty because the relevant hole can be made from the aforementioned drive pin end. The sleeve-shaped or annular closing elements, preferably having only a slightly larger external diameter than the drive pin, can be pushed onto the drive pin without difficulty. Together with the respectively adjacent closing element, the radial protrusions and the relevant seat elements on the housing act to ensure the relevant valve function. Thus the relevant mutually adjacent valve spaces are connected together by the intermediate spaces located between the radial protrusions when the closing element is lifted from the valve seat whereas, when the closing element is in contact with the seat element, these spaces are shut off from one another.

Because at least one part of the closing elements interacts elastically flexibly with the seat elements, there is reliable compensation for tolerance which further increases the functional reliability of the multiway valve. The closing elements or the seat elements or both can be arranged or configured to be elastically flexible. In addition, it is possible, in contrast to spool valves, for the valve housing to be made of plastic.

If the drive pin end opposite to the passage opening in the end is guided and supported so that it seals, a setting unit acting on the drive pin can be associated with the free end of this drive pin emerging outwards through the wall at the bottom of the hole in accordance with the present invention.

The second closing element can be used to shut off the intermediate space adjacent to the first chamber from a further intermediate space adjoining it in the direction of the second chamber, in one valve position, and to shut off the first chamber from the intermediate space adjacent to it, in the other valve position.

The annular end surface of the drive pin incorporated in the present invention provided in the region of the relevant longitudinal passage opening simultaneously acts as the sealing surface of the first closing element which interacts with the bottom of the second chamber acting as a seat element. The interconnection between the connection opening into the first chamber and the connection opening into the second chamber is therefore interrupted in that, in the relevant position of the drive pin, the end surface of the drive pin with the passage opening is held against the bottom of the second chamber. The preferred connection paths are such that the first and second end chambers and the intermediate spaces, and, on the other hand, the closing elements are located and configured such that, in one valve position, only the first end chamber is connected to the adjacent intermediate space and the second end chamber is connected to the intermediate space adjacent thereto it and, in the other valve position, only the first end chamber is connected, via the inner longitudinal passage, to the second end chamber and one intermediate space is connected to the other intermediate space.

Whereas the first closing element or the annular flange can be permanently connected to the drive pin in one embodiment, it is useful for the second closing element to be displaceable relative to the drive pin and spring-loaded in order to achieve the desired compensation for tolerance.

A passage opening into the intermediate space adjacent to the first chamber can be connected via the first chamber, and the longitudinal passage formed in the drive pin and the second chamber to the connection opens into this second chamber. The interconnection between these two connections can be interrupted in that the first chamber can be shut off from the intermediate space adjacent to it by the first closing element. The first chamber is exclusively and continuously connected via the longitudinal passage in the drive pin and the second chamber to one of the connections. This connection is formed by the connection opening into the second chamber. The drive pin end surface with the passage opening is at a distance from the bottom of the second chamber in each of the two valve positions. Because the first closing element is located in the intermediate space adjacent to the second chamber, this intermediate space is connected to the intermediate space adjoining it in the direction of the first chamber in one valve position, and is connected to the second chamber in the other valve position.

In a configuration of the present invention in which the ring is arranged to be spring-loaded by a compression spring pushed onto the drive pin and supported at one end on the ring and at the other end on a stop on the drive pin, it is thereby achieved that, depending on the position of the drive pin, one of the two rings is in sprung contact with an associated seat element whereas the other ring is held by the radial protrusions against a seat element associated with it. In this case also, therefore, optimum compensation for tolerance is always ensured.

It is useful for the drive pin to be spring-loaded into a first valve position and to be movable against the spring force into a second valve position by way of the setting unit. One presently preferred configuration of the seat elements is that the seat elements are at least partially formed by annular end surfaces of annular grooves opening into the axial hole.

A temperature sensor for the temperature of the fluid in the valve can also be provided and is particularly useful if the multiway valve is inserted in a fuel injection system of an internal-combustion engine.

A particularly advantageous way of arranging the multiway valve of the present invention in a fuel injection system of an internal-combustion engine such that preferably in the form of an electrical NTC thermistor, temperature sensor is located in one of the second end chamber and in a connection.

BRIEF DESCRIPTION OF THE DRAWING

These and further objects, features and advantages of the present invention will become more apparent from the following detailed description of currently preferred embodiments when taken in conjunction with the accompanying drawings wherein.

DETAILED DESCRIPTION OF THE DRAWINGS

Figure 1:
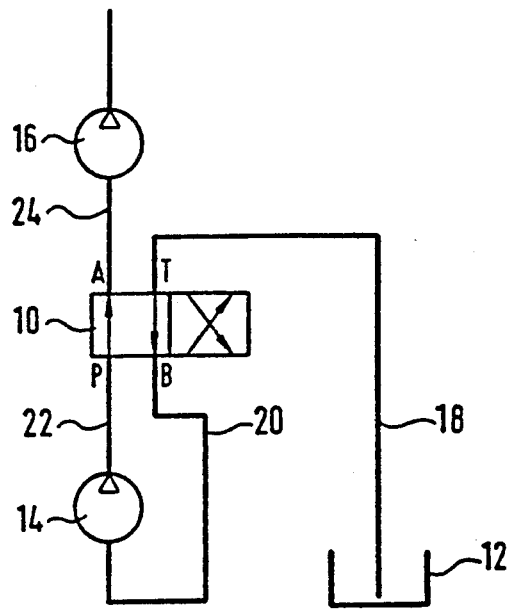
FIG. 1 is a schematic diagram of an internal-combustion engine fuel injection system including the multiway valve according to the present invention.

An embodiment of the application of a multiway valve 10, more particularly a 4/2-way valve of the type involved with the present invention, in a fuel injection system, is shown in FIG. 1. The four connections P, T, B and A are always interconnected in pairs. It is possible to change the pairwise association of the connections P, T, B, A by switching over from one valve position to the other valve position.

In addition to the multiway valve 10, the fuel injection system includes a fuel tank 12, a feed pump 14 and an injection pump 16. The fuel tank 12 is connected via a conduit 18 to the connection T, the connection B via a conduit 20 to the suction side of the feed pump 14, the pressure side of the feed pump 14 via a conduit 22 to the connection P and the connection A via a conduit 24 to the suction side of the injection pump 16.

In the valve position shown of the multiway valve 10, the suction side of the feed pump 14 is connected to the fuel tank 12 and the pressure side of the feed pump is connected to the suction side of the injection pump 16. The multiway valve 10 assumes this valve position during operation of the internal-combustion engine (not shown) associated with the injection pump 16.

As soon as the engine is switched off, the multiway valve 10 switches over into its other valve position, in which the suction side of the feed pump 14 is connected to the suction side of the injection pump 16 and the pressure side of the feed pump 14 is connected to the fuel tank 18. As a result, the feed pump 14, which is initially still running, can suck out the fuel still present in the injection pump 16.

Preferred embodiments of the multiway valve 10 are explained below using FIGS. 2 to 5, in each of which a 4/2-way valve is shown in a representation in partial axial section. The connections of the 4/2-way valve are indicated by P, T, B and A, corresponding to the representation of FIG. 1.

Figure 2:
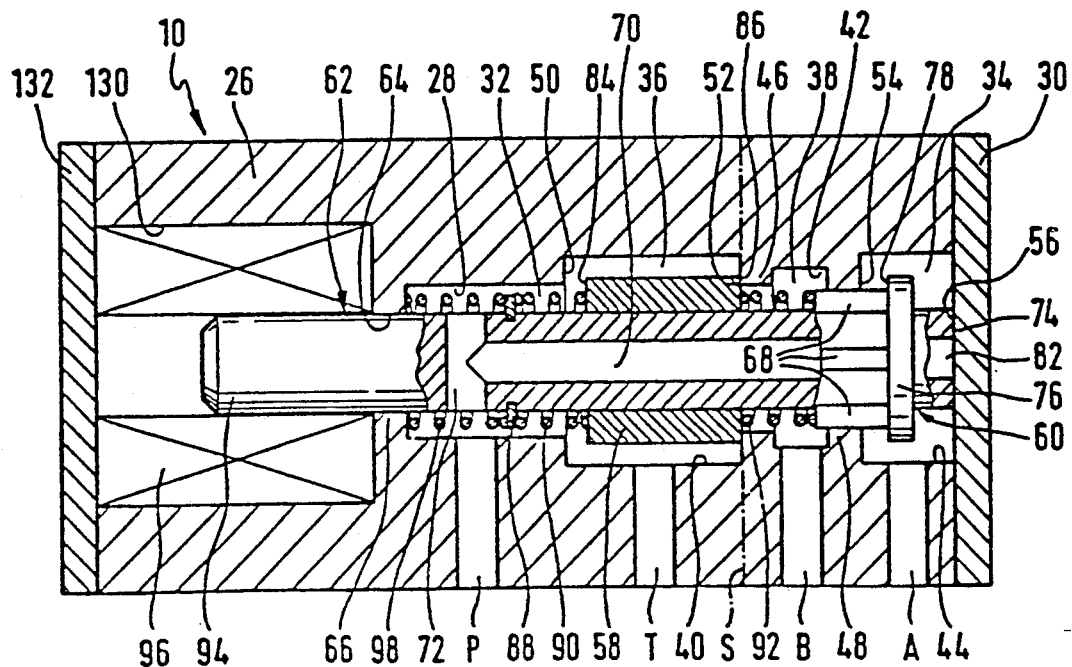
FIG. 2 is a partially sectioned view of a first embodiment of the multiway valve shown in FIG. 1 with a displaceable closing element located on the drive pin and a closing element permanently connected thereto.

In the embodiment shown in FIG. 2, the valve housing 26 is provided with an axial hole 28 which has a plurality of steps. The connections P, T, B, A, which are respectively designed as radial holes, open into the axial hole 28. The axial hole 28, configured as a blind hole, is closed in a sealed manner by an end wall 30 of the valve housing 26.

The axial hole 28, with the plurality of steps, includes two end chambers 32, 34 and two intermediate spaces 36, 38 located between these end chambers. The connection P opens into the first end chamber 32, the connection A opens into the opposite second end chamber 34, the connection T opens into the intermediate space 36 adjacent to the first chamber 32, and the connection B opens into the intermediate space 38 adjacent to the second chamber 34.

The intermediate spaces 36, 38 and the second chamber 34 are each widened radially by annular grooves 40, 42, 44 provided on the inner periphery of the axial hole 28. The annular groove 42 has a smaller diameter than the two annular grooves 40, 44, and an annular protrusion 46, 48 respectively remains between the annular grooves 40, 42 and between the annular grooves 42, 44.

The plurality of steps thus provided in the axial hole 28 produce four seat elements 50, 52, 54, and 56 located in series in the longitudinal direction of the axial hole 28. The seat elements 50, 52 are formed by the two mutually facing annular end surfaces of the annular groove 40. The seat element 54 is formed by the annular end surface of the annular groove 44 facing away from the intermediate space 38, and the seat element 56 is formed by the bottom of the second chamber 34, or by the end wall 30 of the valve housing 26.

A rod-shaped drive pin 62 carrying two closing elements 58, 60 is located in the axial hole 28. One end of this drive pin 62 extends through an opening 64 in the bottom 66 bounding the first chamber 32 and is guided so that it seals in this opening 64. In the region of its end close to the second chamber 34, the drive pin 62 is supported and guided in the axial hole 28 by radial protrusions 68 provided on its outer periphery. By way of the radial protrusions 68 permanently connected thereto, the drive pin 62 is radially supported on the housing annular protrusion 48 which is located between the second chamber 34 and the intermediate space 38 adjacent thereto.

The drive pin 62 has a central, inner longitudinal passage 70 which communicates with the first chamber 32 via a plurality of radial holes 72 in the region of its lefthand end which is guided so that it seals. The central longitudinal passage 70 opens into the second chamber 34 at the right-hand end of the drive pin 62, i.e. the end located in the second chamber 34, at the relevant end surface 74 of the drive pin 62.

The first closing element 60 located in the second end chamber 34 includes an annular flange 76 surrounding the drive pin 62 and directly adjoining the radial protrusions 68 in the direction of the end wall 30. This annular flange 76 has a sealing surface 78 on the side of the protrusions to interact with the seat element 54.

The other sealing surface of this first closing element 60 is formed by the annular end surface or end 74 at the end of the drive pin 62 located in the second chamber 34 and having the longitudinal passage opening 82. In the valve position shown in FIG. 2, the end 74 of the drive pin 62 is in contact with the seat element 56 formed by the bottom of the second chamber 34, whereas the flange 76 is at a distance from the seat element 54.

The second closing element 58 located in the intermediate space 36 adjacent to the first chamber 32 again has two sealing surfaces 84, 86 facing away from one another to interact with the two respective seat elements 50, 52 which bound the intermediate space 36.

In the currently contemplated embodiment, the second closing element is a sleeve 58 pushed onto the drive pin 62 and displaceable relative thereto. Compression springs 92 and 90 are respectively pushed onto the drive pin 62 between the radial protrusions 68 and the end of the sleeve 58 facing towards them and between the opposite end of the sleeve 58 and a drive pin stop 88. The external diameter of the sleeve 58 is slightly larger than the smallest internal diameter of the axial hole 28 in the region of the first chamber 32 and in the region of the annular protrusions 46, 48 so that the ring 58, which is somewhat shorter axially than the annular groove 40, enters into this annular groove 40. The sleeve 58 is therefore forced by the two compression springs 90, 92 into a central or equilibrium position and can be elastically displaced relative to the drive pin 62 in the longitudinal direction of the drive pin. This sleeve 58 is sealed at its inner periphery against the outer periphery of the drive pin 62. The stop 88 can, for example, be an abutment ring or retaining ring.

The sleeve 58 is spring-loaded at both ends and is therefore held in sprung fashion on one or other of the two seat elements 50, 52 bounding the intermediate space 36, depending on the valve position. The sealing surfaces 84, 86 of the sleeve 58 are formed by the end surfaces of the sleeve 58. In the position of the drive pin 62 shown in FIG. 2, the right-hand end or sealing surface 86 of the sleeve 58 is held so as to seal against the seat element 52.

The end 94 of the drive pin 62 emerging from the opening 64 is acted on by a setting unit, e.g. an electromagnet 96 in the illustrated embodiment. The drive pin 62 is also loaded by a compression spring 98 pushed onto it and located in the first chamber 32. This compression spring 98 is, in turn, supported on the bottom 66 of the first chamber 32 at one end and on the stop 88 on the drive pin at the other end. The drive pin 62 can therefore be moved by the electromagnet 96, against the spring force, from the first valve position shown into a second valve position.

The method of operation of the multiway valve shown in FIG. 2 is as follows. When no current is supplied to the electromagnet 96, the compression spring 98 holds the drive pin 62 in the first valve position shown in FIG. 2, in which only the first chamber 32 is connected to the intermediate space 36 adjacent thereto, and the second chamber 34 is connected to the adjacent intermediate space 38. Consequently, on one hand, the connections P and T are interconnected and on the other hand, the connections B and A are interconnected.

As soon as the electromagnet 96 is energized, the drive pin 62 is moved to the left into the second valve position against the spring force imposed by the compression spring 98. In this second valve position, only the first chamber 32 is connected via the longitudinal passage 70 to the second chamber 34 and one intermediate space 36 is connected to the other intermediate space 38. The connections P and A are therefore interconnected, on one hand, and the connections T and B are interconnected, on the other hand.

Figure 3:
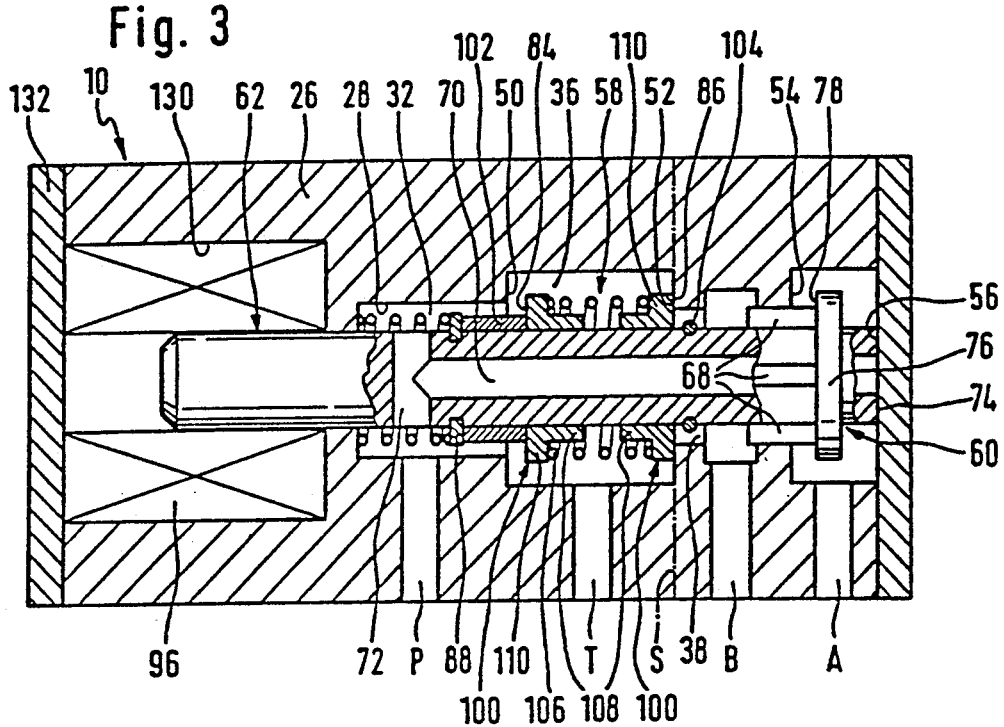
FIG. 3 is a partially sectioned view of a second embodiment of the multiway valve of the present invention with a two-part displaceable closing element.

The embodiment shown in FIG. 3 differs in practical terms from the embodiment of FIG. 2 only in that the second closing element 58 is constructed in two pieces. The second closing element 58 thus includes two sleeve elements 100 which are located one behind the other in the longitudinal direction of the drive pin, are each pushed onto the drive pin 62 and are displaceable relative thereto. In the embodiment shown in FIG. 3, the stop 102 associated with the left-hand sleeve element 100 is formed by an abutment sleeve which is supported, at the end facing away from this sleeve element 100, on the stop 88 on the drive pin, which is in turn an abutment ring. The stop 104 associated with the right-hand sleeve element 100 is also formed by an abutment ring.

A compression spring 106 is provided between the two sleeve elements 100, and pushes these two sleeve elements 100 apart in the direction of the two outer stops 102, 104. The distance between the two stops 102, 104 relative to the distance between the two associated seat elements 50, 52 on the housing is dimensioned such that, depending on the valve position, one or other sleeve element 100 is held in sprung fashion against the relevant seat element 50, 52. In the first valve position shown in FIG. 3, the right-hand sleeve element 100 is held in a sprung manner against the seat element 52 so that the two intermediate spaces 36, 38 are, in turn, shut off from one another. Because the left-hand sleeve element 100 is at a distance from the associated seat element 50, the left-hand chamber 32 communicates with the intermediate space 36 adjacent thereto.

Each of the two sleeve elements 100 includes a sleeve-type section 108 and an annular flange 110 adjoining it at the stop end. The end surface, at the stop end and facing away from the sleeve-type section 108, of this annular flange 110 forms the relevant sealing surface 84, 86.

The two ends of the compression spring 106 are respectively pushed onto the sleeve-type section 108 of the respective sleeve element 100 so that the compression spring 106 is supported on the inner end surfaces, facing towards one another, of the annular flanges 110 associated with the two sleeve elements 100. The method of operation of the embodiment of FIG. 3 corresponds to the method of operation of the embodiment of FIG. 2.

Figure 4:
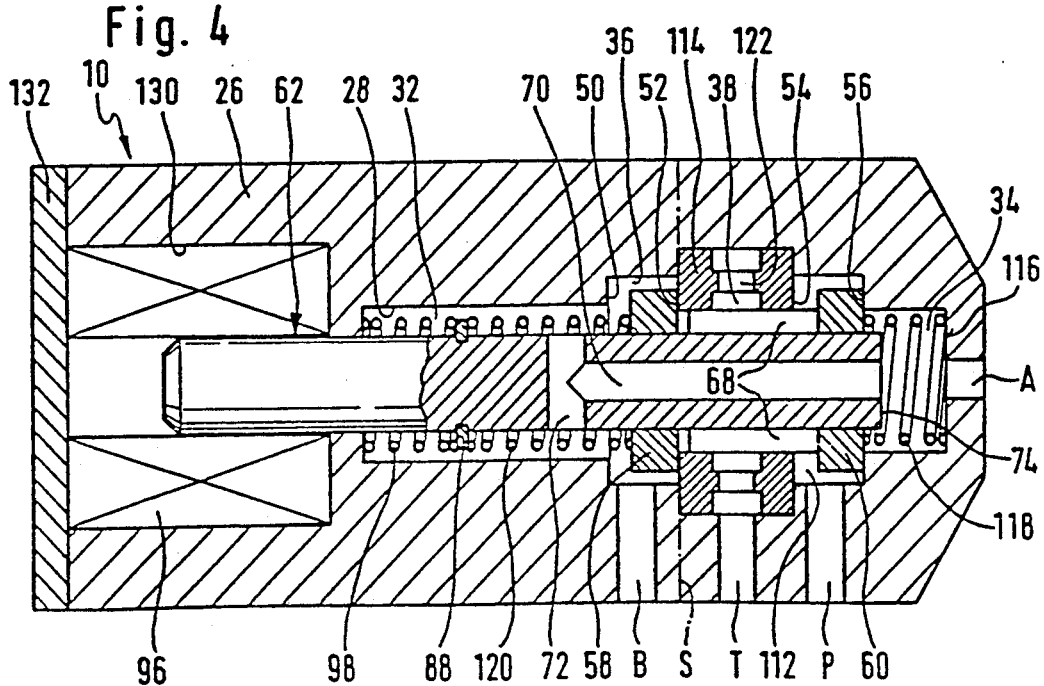
FIG. 4 is a partially sectioned view of a third embodiment of the multiway valve of the present invention.

The embodiment of FIG. 4 differs from those of FIGS. 2 and 3 mainly in that three intermediate spaces 36, 38, 112 are provided. The first closing element 60 is located in the intermediate space 112 adjacent to the second chamber 34, and the first chamber 32 is exclusively and continually connected via the longitudinal passage 70 of the drive pin 62 and via the second chamber 34 to one of the connections P, T, B, A. This connection is formed by the connection A opening into the second chamber 34.

The second closing element 58 is again located in the intermediate space 36 adjoining the first chamber 32. Just as in the previously described embodiment, there is no closing element located in the intermediate space 38 adjoining the first chamber 32 and radially bounded by a ring insert 114 in FIG. 4. Each of the first and second closing elements is formed by a spring-loaded ring 60 or 58 pushed onto the drive pin 62 and displaceable relative thereto.

The ring 60 is held in sprung fashion against the radial protrusions 68 adjoining it in the direction of the first chamber 32 and permanently located on the outer periphery of the drive pin 62, whereas the ring 58 located on the opposite side of the radial protrusions 68 is forced in sprung fashion against these radial protrusions 68 in the direction of the second chamber 34. The right-hand ring 60 is acted on by a compression spring 118 located in the second chamber 34. This compression spring 118 is supported at one end on the ring 60, and at the other end on the bottom 116 of the second chamber 34. The ring 58 is acted on by a compression spring 120 pushed onto the drive pin 62. This compression spring 120 is supported at one end on the ring 58 and at the other end on the stop 88 on the drive pin.

The axial length of the radial protrusions 68 relative to the distance between the relevant seat elements 50, 54 and 52, 56 and the axial length of the rings 60, 58 are dimensioned such that, depending on the valve position, one of the two rings 60, 58 is in contact in sprung fashion on an associated seat element 52, 54, whereas the other ring 58, 60 is held by the radial protrusions 68 against a seat element 50, 56 associated therewith. In the first valve position shown in FIG. 4, the right-hand ring 60 is held by the radial protrusions 68 against the seat element 56, whereas the left-hand ring 58, which is at a distance in this valve position from the annular protrusions 68, is forced by the compression spring 120 in sprung manner against the seat element 52.

The two seat elements 52, 54 are formed by the two end surfaces of the ring insert 114 introduced into the axial hole 28. This ring insert 114 has both an outer annular groove 134 connected to the connection T and an inner annular groove 136 which is associated with the intermediate space 38 or opens into it. The two annular grooves 134, 136 of the ring insert 114 are connected together by radial passages 122.

The association of the connections in the embodiment of FIG. 4 is different from that of the previously described embodiments. The connection B now opens into the intermediate space 36 adjacent to the first chamber 32, the connection T opens into the intermediate space 38 adjoining it in the direction of the second chamber 34, the connection P opens into the intermediate space 112 adjacent to the second chamber 34, and the connection A opens into the second chamber 34. Whereas the connections B, T and P are again respectively configured as radial passages, connection A is an axial passage or axial opening in the bottom 116 of the second chamber 34. The right-hand end 74 of the drive pin 62 is clearly at a distance from the bottom 116 of the second chamber 34 even in the first, right-hand valve position shown so that, whatever the particular valve position, the first chamber 32 is continually connected to the second chamber 34 via the longitudinal passage 70.

Figure 5:
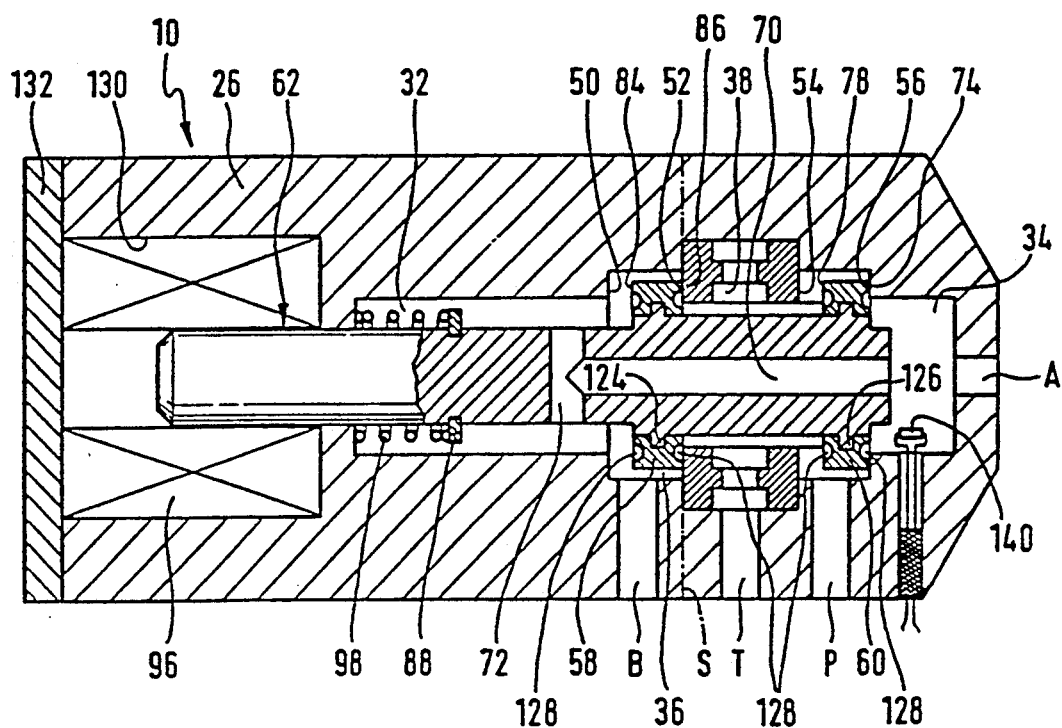
FIG. 5 is a partially sectioned view of a fourth embodiment of the multiway valve of the present invention with closing elements consisting of elastic material permanently located on the drive pin and with an integrated temperature sensor.

The embodiment shown in FIG. 5 differs from that of FIG. 4 only in that the two annular closing elements 58, 60 surrounding the drive pin 62 are no longer displaceably located on the drive pin 62 but are permanently connected to the latter and consist of elastic material. These annular closing elements 58, 60 are fastened on the drive pin 62 by providing each of them with an annular groove on the inner periphery and by placing them on annular protrusions 124, 126 provided on the outer periphery of the drive pin 62. These closing bodies 58, 60, configured as elastically deformable annular parts, have an annular recess 128 on each of their ends. The elastic deformability of the annular parts is further increased by the resulting weakening in the central region. Because of this elastic deformability of the annular closing elements 58, 60, their radially outer regions having the sealing surfaces 84, 86 and 78, 74 have a certain axial mobility relative to the drive pin 62 so that both closing bodies 58, 60 can interact simultaneously so as to seal with the seat elements 50, 54 and 52, 56 associated with them and respectively formed by an annular surface.

In all the foregoing embodiments, the electromagnet 96 is accommodated in a blind hole 130 of the valve housing 26. This blind hole 130 is closed by an end wall 132 on the related end of the housing 26 which can be constructed as a plurality of parts corresponding to the steps chosen for the axial hole 28, as is indicated for example by the dot-dash line S in FIGS. 2 to 5.

The method of operation of the two embodiments shown in FIG. 4 and 5 is as follows. When no current is supplied to the magnet 96, the drive pin 62 is held by the compression spring 98, via the stop 88, in the illustrated right-hand valve position in which only the intermediate space 36 adjacent to the first chamber 32 is connected to the second chamber 34 via the first chamber 32 and the longitudinal passage 70, and the intermediate space 112 adjacent to the second chamber 34 is connected to the intermediate space 38 adjacent thereto. In the first valve position shown in FIGS. 4 and 5, therefore, the connections B and A are interconnected with each other, and the connections T and P are interconnected with each other.

As soon as the electromagnet 96 is energized, the drive pin 62 is displaced against the force of the compression spring 98 into a left-hand, second valve position. In this second valve position (not shown), only the intermediate space 36 adjacent to the first chamber 32 is connected to the intermediate space 38 adjacent to it and the second chamber 34 is connected to the adjacent intermediate space 112. Therefore, the connections B and T are interconnected with each other, and the connections P and A are interconnected with each other.

It may be seen from FIG. 5 that the valve can also be equipped with a temperature sensor 140 such as, for example, an electrical NTC thermistor. The arrangement shown, with the fuel temperature sensor near the connection A, can be used with each of the above-described embodiments, particularly when the multiway valve shown is to be employed in an internal-combustion engine fuel injection system exemplified in FIG. 1.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A multiway valve with two valve positions with permanent pairwise connections so as to be able to change pairwise association of the connections by switching over from one valve position to a respective other valve position, comprising a valve housing with an axial hole which has a plurality of steps forming serially arranged seat elements, and first and second end chambers with an intermediate space therebetween into which one of the connections opens; a spool-type drive pin carrying at least two closing elements located in the axial hole, the drive pin being guided so as to seal in the region of a first of the two chambers, one of the connections also opening at least into the second end chamber; at least one radial hole connecting an inner longitudinal passage provided in the drive pin to the first end chamber at one end, the longitudinal passage opening at the other end into the second chamber on the associated end surface of the drive pin, and the closing elements interacting at least partially elastically and flexibly with the seat elements and each being of one of a sleeve-shaped and annular configuration, wherein the seat elements comprise at least four seat elements located in series and the intermediate spaces comprise at least two intermediate spaces located between the first and second end chambers, the drive pin is radially supported in a region of its end close to the second end chamber by radial protrusions provided on an outer periphery thereof, the closing elements include two oppositely direct sealing surfaces arranged to be laid on a seat element of the associated seat element pair, depending on valve position, and a first of the closing elements directly adjoins the radial protrusions in a direction of the second end chamber, wherein one of the connections opens directly into each of the first and second end chambers, the first closing element includes an annular flange surrounding the drive pin and adjacent to the radial protrusions, which annular flange is located in the second end chamber, the annular flange including, on a protrusion end, a sealing surface which interacts with one of the seat elements located between the second end chamber and the adjacent intermediate space, and the other sealing surface of the first closing element is formed by the associated end surface of the drive pin provided in a region of a related longitudinal passage opening, which associated end surface is held in one of two valve positions against another of the seat elements formed by a bottom of the second end chamber.

2. The multiway valve according to claim 1, wherein the drive pin extends through an opening in a bottom bounding the first chamber and is guided so as to seal in a region of the opening.

3. The multiway valve according to claim 2, wherein an end of the drive pin emerging from the opening is operatively associated with an electromagnetic setting unit.

4. The multiway valve according to claim 1, wherein a second of the closing elements is located in the intermediate space adjacent to the first end chamber, sealing surfaces of the second closing element interacting with two of the seat elements bounding the intermediate space.

5. The multiway valve according to claim 1, wherein two of the intermediate spaces each associated with one of the connections are provided between the first and second end chambers, and a second of the closing elements is located only in the intermediate space adjacent to the first end chamber.

6. The multiway valve according to claim 5, wherein, on one hand, the first and second end chambers and the intermediate spaces, and, on the other hand, the closing elements are located and configured such that, in one valve position, only the first end chamber is connected to the adjacent intermediate space and the second end chamber is connected to the intermediate space adjacent thereto it and, in the other valve position, only the first end chamber is connected, via the inner longitudinal passage, to the second end chamber and one intermediate space is connected to the other intermediate space.

7. The multiway valve according to claim 1, wherein the annular flange is permanently connected t the drive pin.

8. The multiway valve according to claim 1, wherein the second closing element is a sleeve pushed onto the drive pin and is displaceable relative thereto, which sleeve is spring-loaded at both ends and is therefore held in sprung fashion on one or other of the two associated seat elements, depending on the valve position.

9. The multiway valve according to claim 8, wherein one compression spring is pushed onto the drive pin and is respectively provided between the radial protrusions and the end of the sleeve facing towards the radial protrusion and between the opposite end of the sleeve and a stop on the drive pin.

10. The multiway valve according to claim 1, wherein the second closing element consists of two parts comprising sleeve elements located one behind the other in a drive pin longitudinal direction, each element being pushed onto the drive pin and displaceable relative thereto, the two elements are located between two stops on the drive pin, and a spring arrangement forcing the elements apart is located therebetween, a distance between the stops being dimensioned relative to a distance between the two associated seat elements such that, depending on valve position, one of the elements is held against the relevant seat element.

11. The multiway valve according to claim 10, the spring arrangement is formed by a compression spring surrounding the drive pin and supported on the two elements.

12. The multiway valve according to claim 10, wherein each of the two elements includes a sleeve-type section and an annular flange connected thereto at the stop end, the outer end surface of the annular flange, at the stop end and facing away from the sleeve-type section, forming the sealing surface.

13. The multiway valve according to claim 12, the spring arrangement is formed by a compression spring surrounding the drive pin and supported on the two elements.

14. The multiway valve according to claim 12, wherein the two ends of the compression spring are each pushed onto the sleeve-type section of the related sleeve element, and the compression spring is supported on mutually facing inner end surfaces of the annular flanges associated with the sleeve elements.

15. The multiway valve according to claim 1, wherein the drive pin is spring-loaded in a first valve position and arranged to be moved into a second valve position against the spring force by a setting unit.

16. The multiway valve according to claim 15, wherein the drive pin is loaded by a compression spring pushed onto the drive pin and located in the first end chamber, said compression spring being supported at one end on a bottom of the first end chamber and at the other end on a stop on the drive pin.

17. The multiway valve according to claim 1, wherein the seat elements are at least partially formed by annular end surfaces of annular grooves opening into the axial hole.

18. The multiway valve according to claim 1, wherein the valve is a 4/2-way valve.

* * * * *